April 12, 1955  A. M. CASTELLO  2,706,114
TORSION-TYPE SUSPENSIONS
Filed May 26, 1950  3 Sheets-Sheet 3

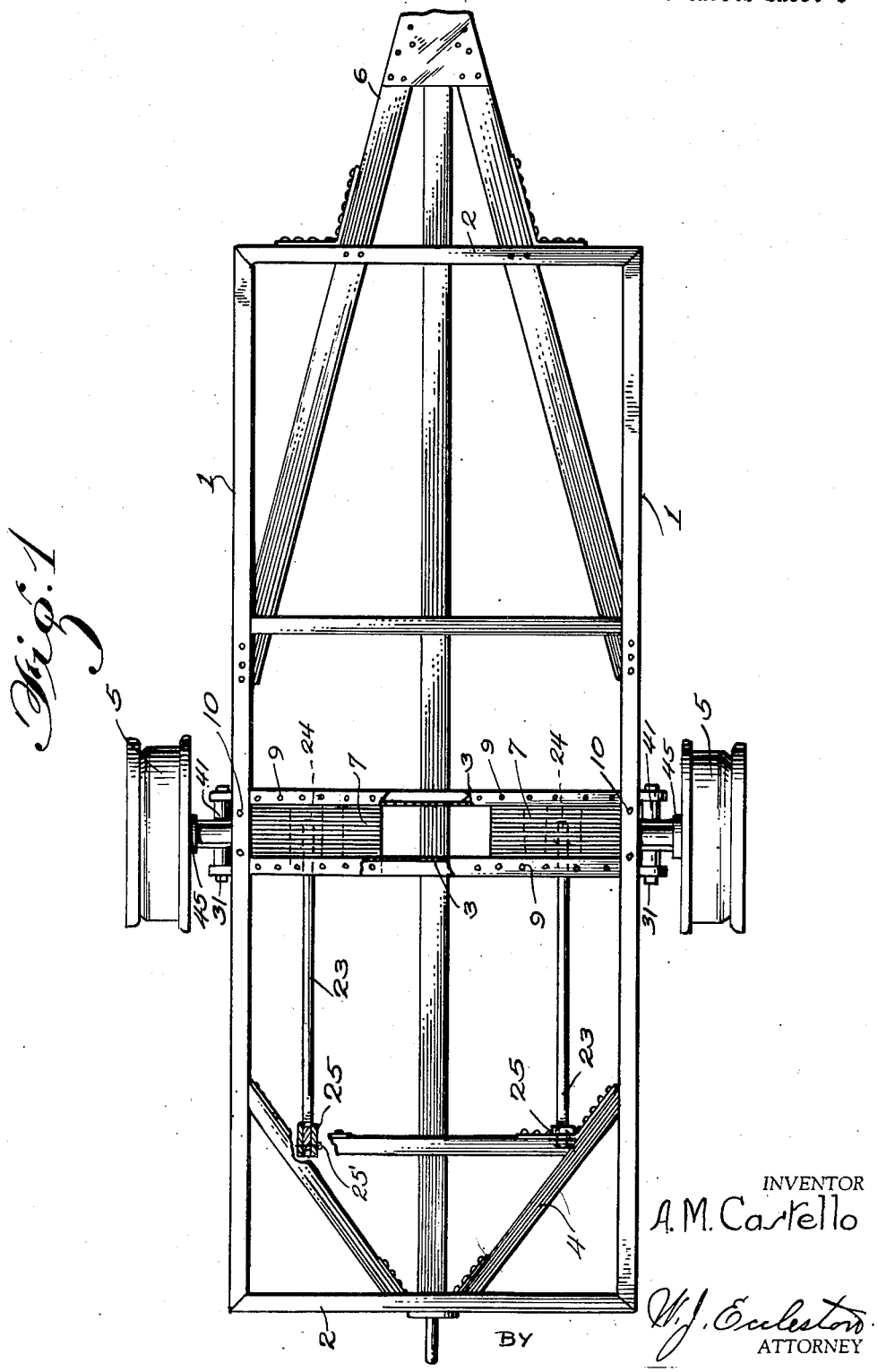

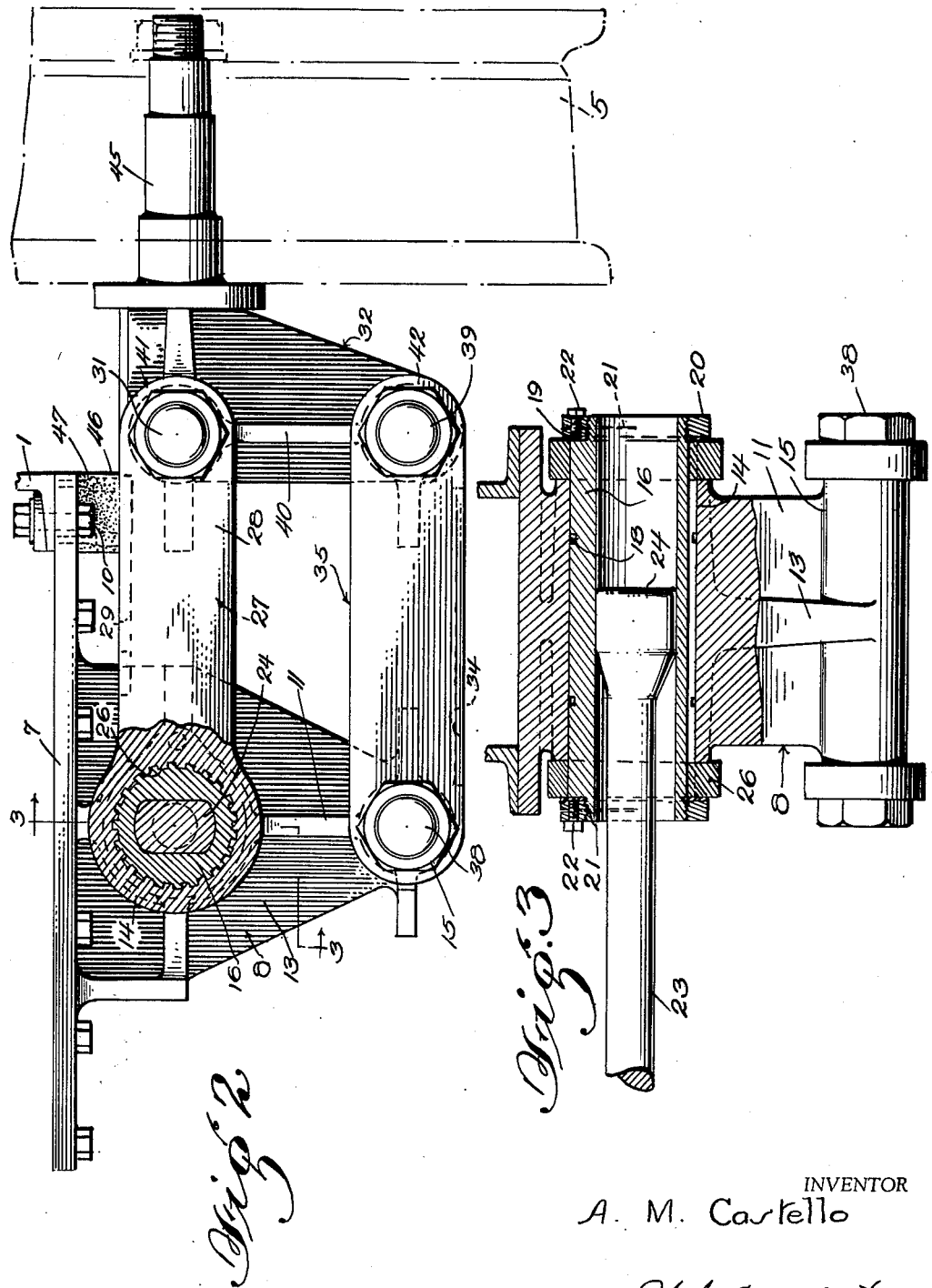

INVENTOR
A. M. Castello
BY
W. J. Eccleston
ATTORNEY

United States Patent Office 2,706,114
Patented Apr. 12, 1955

2,706,114

TORSION-TYPE SUSPENSIONS

Anthony M. Castello, Louisville, Ky.

Application May 26, 1950, Serial No. 164,580

6 Claims. (Cl. 267—57)

(Granted under Title 35, U. S. Code (1952), sec. 266)

The invention described herein, if patented, may be manufactured and used by or for the Government for governmental purposes, without the payment to me of any royalty thereon.

This invention relates to torsion-type suspensions for vehicle wheels and has for one of its objects to generally improve such structures.

Another object of the invention resides in so arranging the parts of the suspension and the hanger or base that the major portions of the suspension are disposed beneath the body or frame of the vehicle thereby permitting a greater width of vehicle frame and body for a given lateral spacing of the wheels.

A further object of the invention consists in a wheel suspension in which the active end of the torsion spring is secured in a bearing sleeve which serves to dampen the action of the spring.

Another object of the invention resides in so splining the torsion spring that extremely fine adjustments may be readily made in order to compensate for any permanent set in the spring.

A still further object of the invention consists in the provision of a torsion spring mounting for the wheels which may be readily interchanged with a conventional leafspring mounting, if desired.

Other objects and advantages of the invention will be apparent from the following description when taken in connection with the accompanying drawings, in which Figure 1 is a more or less diagrammatic plan view of the frame or chassis of one form of vehicle on which the novel spring suspension is installed;

Figure 2 is a side elevational view of the spring suspension per se, shown partly in section;

Figure 3 is a vertical sectional view taken on line 3—3 of Figure 2;

Figure 4:
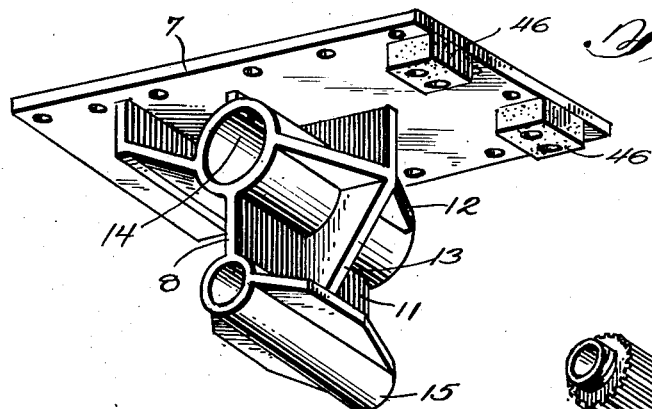
Figure 4 is a perspective view of the base plate and bracket in which the supporting arms for the wheels are journaled.
Figure 5:
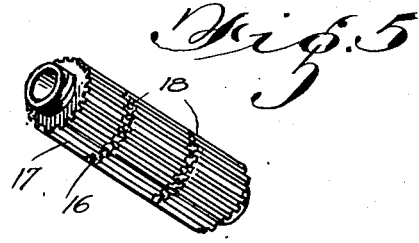
Figure 5 is a perspective view of the pintle or journal in which one end of the torsion spring is fixed.
Figure 6:
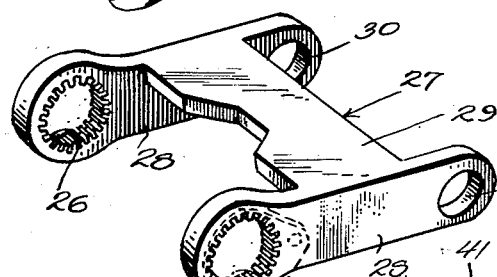
Figures 6 and 7 are perspective views of the upper and lower arms, respectively, of the spring suspension.

The frame or chassis of the vehicle illustrated in the present disclosure is shown in Figure 1 and comprises side rails 1 and the end rails 2 of channel formation, suitably braced at its mid-portion by the transversely extending channel bars 3 and the angularly arranged bars 4 at the rear of the frame. The particular vehicle disclosed is of the two-wheel trailer type and is provided with the wheels 5 and a suitable tongue construction 6 through the medium of which it may be connected to a tractor or other motive power.

The spring suspension for individually associating the wheels 5 with the frame of the vehicle includes a base plate 7 and a bracket which is generally indicated by the numeral 8 (Figure 4). These base plates, one on each side of the vehicle, are disclosed in combination with the vehicle frame in Figure 1, and are disposed on the underneath side of the transverse bracing channels 3 adjacent the mid-portion of the width of the vehicle frame. The base plates may be secured to the bottom flanges of the channels 3 by a series of bolts 9, and the extreme outer ends of the base plates may be secured to the lower flange of the channel bars constituting the side rails 1 by one or more bolts 10, as indicated in detail in Figure 2.

Depending from each of the base plates 7 is the bracket 8, heretofore referred to, and comprises the vertically disposed plate 11 suitably reinforced by right angularly disposed webs 12 and 13 and having associated therewith upper and lower bearings 14 and 15.

Mounted for oscillatory movement within the upper bearing 14 is a pintle or journal 16 which is in the form of a sleeve and provided with a continuous series of key-ways 17, there being 21 of such key-ways depicted in the present illustration, although it is essential only that an odd number of key-ways be employed, for a purpose to be indicated hereinafter. The journal 16 is provided with circular oil grooves 18, and when installed in the bearing 14 the ends of the key-ways are sealed against escape of lubricating oil by means of gaskets 19. The sleeve-like journal or pintle 16 is secured in position in the bearing by having threaded to the opposite ends thereof the nuts 20. These nuts may be locked against accidental removal or loosening by being provided with slots 21, substantially midway of their thickness, and bolts 22 which are threaded into the nuts 20 across the grooves 21 so as to jam the threads on the respective parts.

The interior of the sleeve journal 16 is shown as of substantially oval contour, but it is necessary only that the interior of the sleeve be of non-circular contour and of a shape corresponding to the end of a torsion bar or spring 23 shown in full length in Figure 1 and in end view in Figure 2. This spring has its end 24 formed into non-circular shape so that it may be interlocked against rotation with respect to the sleeve 16 which receives one end of the bar. The opposite end of the torsion spring or bar 23 is similarly shaped and is detachably received in a pocket 25 suitably fixed to the vehicle frame in alignment with the sleeve journal 16. This end of the spring and the pocket are provided with aligned apertures for the reception of a bolt 25' for releasably securing the spring within the pocket 25.

Figures 7, 8:
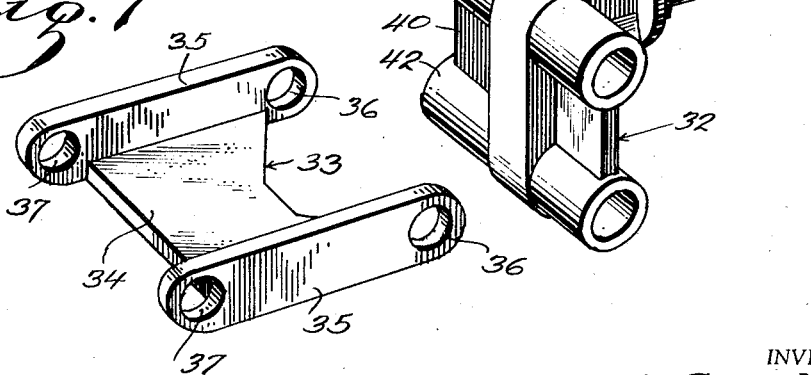
Figure 8 is a perspective view of the wheel mount which is pivotally connected to the free ends of the spring suspension arms.

Keyed to the sleeve 16 by two series of keys 26, each composed of 21 keys in the present installation, is the upper arm 27 of the spring suspension. This arm comprises two side members 28 and a connecting web 29, and the end of the members 28 opposite the series of keys 26 are provided with openings 30 for the reception of a pintle 31, whereby the arm may be pivotally connected to the wheel mount which is generally indicated by the numeral 32 (Figures 2 and 8). Pivotally mounted in the lower bearing 15 of the bracket 8 is a lower arm 33 comprising a web portion 34 and side members 35 provided with pintle-receiving openings 36 and 37 at their front and rear ends respectively. The rear end of the arm 33 is pivoted in the bearing 15 by means of a pintle 38, and the forward end of the arm is pivotally connected to the wheel mount 32 by means of a pintle 39.

The wheel mount 32 comprises a substantially vertically disposed web or plate portion 40 with which are associated the upper and lower bearings 41 and 42 which receive the pintles 31 and 39 for pivotally connecting the wheel mount to the upper and lower arms 27 and 33 of the spring suspension. The wheel mount 32 also includes reinforcing webs 43 and 44 and a suitable axle 45 on which a wheel 5 is rotatably mounted. This arrangement of the substantially horizontal upper and lower arms 27 and 33 pivotally connected to the vertically disposed bracket 8 and wheel mount 32 provides a pantograph construction which maintains movement of the wheel 5 in a vertical plane. Upward movement of the spring arm 27, and consequently of the wheel 5 is limited by means of rubber bumpers or the like 46, shown in compressed condition (Figure 2), and which may be secured to the outer end of the base plate 7 by means of screws 47.

In the event that a permanent set is created in one of the torsion springs 23 after continued use of the vehicle, this may be rectified by removing the upper arm 27 from the sleeves 16 and moving the arm downwardly to a degree corresponding to the permanent distortion of the torsion spring. Ordinarily, the smallest adjustment would correspond to the distance between the center lines of two adjacent keys 26, but by reason of the use of an odd number of spline-ways and keys, it will be apparent that an adjustment of half the distance between the center lines of two adjacent keys may be provided if the torsion springs 23 is removed from the pocket 25 and rotated through 180° before reinstalling in its pocket 25.

In the operation of the device the torsion springs 23 are fixed by their non-circular ends in the pockets 25 and in the sleeve journals 16, and the upper arms 27 splined to the sleeves so as to support the wheels 5 in the desired relation to the vehicle frame 1, and the pantograph arrangement of the arms, bracket and wheel mount provides for the parallel movement of the wheel when it encounters obstructions or uneven road surfaces. In this vertical movement of the wheel 5 the splined sleeve 16 rotates or oscillates within the bearing 14 and thus provides a dampening effect on the movement of the wheel. Moreover, by the present novel arrangement in which the spring suspension is mounted on a vertically disposed bracket depending from a base plate 7 which is secured adjacent the center line of the vehicle, it will be apparent that a major portion of the spring mount is disposed beneath the vehicle so that the body of the vehicle may be of conventional width even though individual spring mounts are provided for the wheels. Furthermore, by reason of the novel arrangement by which the spring arm 27 is connected with the torsion spring, it will be apparent that a much finer adjustment to compensate for a permanent set in the torsion spring is provided.

In accordance with the patent statutes I have described what I now consider to be the preferred form of construction, but inasmuch as various changes may be made in structural details without modifying the essentials of the invention it is intended that all such changes be included within the scope of the appended claims.

I claim:

1. In a vehicle wheel suspension, a bracket, upper and lower sleeve bearings carried by the bracket, a sleeve journal oscillatably mounted in one of said bearings with its ends extending beyond the same, said journal provided with an odd number of key-ways extending throughout its outer surface, a torsion spring fixed to said journal, an arm keyed to the ends of the journal with a number of keys corresponding with the number of key-ways, a second arm pivotally mounted in the other of said bearings, a wheel mount, and means pivotally connecting the wheel mount to said arms.

2. In a vehicle wheel suspension, a bracket, upper and lower sleeve bearings carried by the bracket, a sleeve journal provided with a series of key-ways extending throughout its outer surface and oscillatably mounted in one of the sleeve bearings with its ends extending beyond the same, an arm keyed to the ends of said sleeve journal exteriorly of the sleeve bearing, a second arm pivotally mounted in the other of said bearings, a wheel mount, means pivotally connecting the wheel mount to said arms, and a torsion spring having one end fixed within said sleeve journal.

3. In a vehicle wheel suspension, a bracket, upper and lower sleeve bearings carried by the bracket, a sleeve journal provided with an odd number of key-ways extending throughout its outer surface and oscillatably mounted in one of the sleeve bearings with its ends extending beyond the same, an arm keyed to the ends of the sleeve journal exteriorly of the sleeve bearing with a number of keys corresponding with the number of key-ways, a second arm pivotally mounted in the other of said bearings, a wheel mount, means pivotally connecting the wheel mount to said arms, and a torsion spring having one end fixed within the sleeve journal.

4. In a vehicle wheel suspension, a bracket, upper and lower sleeve bearings carried by the bracket, a sleeve journal provided with a series of key-ways extending throughout its outer surface and oscillatably mounted in one of the sleeve bearings with its ends extending beyond the same, an arm keyed to the ends of said sleeve journal exteriorly of the sleeve bearing, a second arm pivotally mounted in the other of said bearings, a wheel mount, means pivotally connecting the wheel mount to said arms, said sleeve journal having a non-circular interior, and a torsion spring having one end formed to fit the non-circular interior of the sleeve journal.

5. In a vehicle wheel suspension, a frame, a base plate secured to the underside of the frame with its outer edge substantially flush with said edge of the frame, a bracket depending from the base plate and spaced a substantial distance inwardly of the edge of said plate, a wheel mounting, vertically-spaced parallel arms pivotally connected to said mounting and to the bracket, and a torsion spring having one end fixed to the frame and the opposite end fixed to the pivot of one of said arms.

6. In a torsion-type spring suspension for vehicle wheels, a sleeve bearing, a sleeve journal rotatably mounted therein and provided with an annular series of key-ways extending throughout its surface and forming annular series of keys or lands in engagement with the interior wall of the sleeve bearing, an arm keyed to the sleeve journal, and a torsion spring having one end fixed to the vehicle frame and the opposite end fixed to the interior of the sleeve journal.

References Cited in the file of this patent

UNITED STATES PATENTS

| 1,737,328 | Parisi | Nov. 26, 1929 |
| 1,968,631 | Bell et al. | July 31, 1934 |
| 2,075,041 | Kliesrath | Mar. 30, 1937 |
| 2,148,029 | Matthews | Feb. 21, 1939 |
| 2,463,040 | MacPherson | Mar. 1, 1949 |

FOREIGN PATENTS

| 410,657 | Great Britain | May 24, 1934 |
| 504,964 | Great Britain | May 3, 1939 |
| 556,241 | Great Britain | Sept. 27, 1943 |
| 588,235 | Great Britain | May 16, 1947 |
| 345,780 | Italy | Jan. 15, 1937 |